United States Patent Office 3,738,977
Patented June 12, 1973

3,738,977
POLYMERIZATION OF ETHYLENE WITH A SUPPORTED PALLADIUM CATALYST
John Biale, Placentia, Calif., assignor to Union Oil Company of California, Los Angeles, Calif.
No Drawing. Continuation-in-part of application Ser. No. 760,724, Sept. 18, 1968. This application Apr. 22, 1971, Ser. No. 136,600
Int. Cl. C08f 1/66, 3/06
U.S. Cl. 260—94.9 DA    5 Claims

ABSTRACT OF THE DISCLOSURE

Hydrocarbon olefins are converted to higher boiling products comprising polymers and oligomers of the olefin and alkylates of the olefin with paraffinic hydrocarbons in the presence of a Group VIII noble metal distended on a synthetic zeolite, i.e., an aluminosilicate molecular sieve, that has been pretreated with hydrogen at conditions to impart selective polymerization or alkylation activity thereto. In a specific embodiment, ethylene is polymerized to low boiling oligomers comprising dimers, trimers, tetramers, etc. by contacting the ethylene under polymerization conditions with a palladium catalyst prepared by impregnation of a palladium salt or ion exchange of palladium from a palladium salt onto a Y molecular sieve that has been pretreated with hydrogen at a temperature from about 200° to 900° F. or is polymerized to solid polymer when the hydrogen treatment is performed at a temperature from 0° to 100° F. The ethylene is also reacted under alkylation conditions with a paraffin hydrocarbon by contacting the olefin and paraffin under alkylation conditions with a palladium deposited on a Y molecular sieve that has been pretreated by contacting with hydrogen at a temperature of from 100° to about 200° F.

DESCRIPTION OF THE INVENTION

This application is a continuation-in-part of copending application Ser. No. 760,724, filed Sept. 18, 1968, now Patent 3,644,565.

The invention relates to the production of higher boiling products from low molecular weight olefins and in particular relates to a method for the catalysis of the oligomerization of hydrocarbon olefins and/or the alkylation of paraffins with hydrocarbon olefins.

The invention comprises the catalysis of the aforedescribed reaction using a Group VIII noble metal supported on a metal aluminosilicate molecular sieve, zeolite, wherein the catalyst is pretreated by contacting with hydrogen at specified temperatures which imparts selective activity to the catalyst for the desired reaction. Specifically, the invention comprises contacting the catalyst with hydrogen at a temperature from about 0° to 100° F. to impart polymerization activity thereto and then using the catalyst for preparation of high molecular weight polyolefins. The invention also comprises contacting the catalyst with hydrogen at a temperature from 100° F. to about 200° F. to impart alkylation activity thereto and subsequently employing the pretreated catalyst for alkylation reactions. The invention further comprises the pretreatment of the catalyst with hydrogen at temperatures from about 200° to about 900° F. and subsequent use of the pretreated catalyst to cause polymerization of low molecular weight olefins. The products obtained from either reaction are useful as blending agents for motor fuels and as chemical intermediates, e.g., the oligomers of low molecular weight olefins can be used as substrates for the formation of aldehydes, alcohols and acids via the oxo type reaction.

Various investigators have reported that molecular sieves or zeolites, which are synthetic aluminosilicates of a crystalline structure and uniform pore diameter, are active as catalysts for the polymerization of hydrocarbon olefins and that such zeolites can also be used as catalysts for alkylation of isoparaffins with hydrocarbon olefins. In these prior applications, the zeolites have not been used with a Group VIII noble metal cocatalyst and the prior art attempts have not investigated the effect of hydrogen pretreatment of the zeolite prior to use in the desired reaction.

I have found that when the zeolite is activated by the incorporation of a Group VIII noble metal thereon that the activity of the resulting catalyst for alkylation and polymerization reactions is substantially altered by the presence of the Group VIII noble metal in the catalyst. It is not known with certainty the mechanism by which the Group VIII noble metal effects the activity of the molecular sieve, however it is believed that the presence of the Group VIII noble metal in the catalyst decreases the population of zeolitic acidic sites that would otherwise be available as polymerization catalysts. It is not believed, however, that all of the anomalous activity of the zeolite in the presence of the Group VIII noble metal can be explained by this phenomena since the amount of noble metal which can change the activity of the zeolite is much less than the stoichiometric equivalent of the acidic sites, e.g., of the order of about 0.5 weight percent. The presence of the Group VIII noble metal on the zeolite substantially deactivates the zeolite for catalysis of polymerization or alkylation unless the catalyst is pretreated with hydrogen in the manner described hereafter.

The catalyst is treated in accordance with my invention by any of a plurality of hydrogen pretreatments which are effective to impart selective activity of the catalyst for polymerization of the olefin to either high molecular weight solid polymers or to oligomers, or to impart activity for alkylation of paraffins with the olefins. Specifically I have found that pretreatment of the molecular sieve by contacting it with hydrogen for a period of from several minutes to several hours imparts activity for: (1) the polymerization of ethylene to high molecular weight solid products when the pretreatment is performed at a temperature from about 0° to 100° F.; (2) imparts an activity of the catalyst for oligomerization of olefins when the pretreatment is performed at a temperature of from 200° to 900° F.; and (3) imparts an activity to the catalyst for the alkylation of paraffin hydrocarbons with hydrocarbon olefins when the pretreatment is performed at a temperature from 100° to about 200° F.

The olefins that can be reacted in accordance with this invention generally comprise the lower molecular weight aliphatic hydrocarbon olefins having from 2 to about 8 carbons; preferably those olefins having from about 2 to about 4 carbons. Examples of suitable reactants include ethylene, propylene, butene-1, butene-2, isobutylene, pentene-1, isopentene, hexene-1, hexene-2, isohexene, heptene-1, heptene-2, heptene-3, isoheptene, 2-ethylhexene, octene, isooctene, etc. Of these, the alpha olefins and the olefins having from 2 to about 4 carbons are preferred classes.

The paraffin that can be alkylated with the olefin in one embodiment of the invention can comprise any normal or iso paraffin having from 2 to about 10 carbons. The catalyst exhibits an unusually high activity for the alkylation of normal paraffins and accordingly the invention finds particular application to the alkylation of this class of hydrocarbon paraffins. Examples of suitable paraffins that can be alkylated with the olefin in accordance with my invention in general comprise ethane, propane, butane, isobutane, pentane, isopentane, hexane, 2-ethylhexane, heptane, isoheptane, octane, isooctane, decane, isodecane, nonane, isononane, etc. The alkylation aspect of the invention is particularly applicable to the alkylation of the low molecular weight paraffins that are in surplus quantities at refineries, e.g., ethane, propane, butane, isobutane, etc., to convert these low molecular weight paraffins to higher boiling hydrocarbons suitable for use as gasoline blending stock.

The catalyst for the reaction comprises a Group VIII noble metal which is supported or distended on a zeolite. The Group VIII noble metal that can be employed can be any of the platinum groups such as platinum, iridium or osmium or any of the palladium subgroups, e.g., palladium, rhodium or ruthenium. Palladium is the preferred catalyst because of its demonstrated greater activity. The catalyst metal is employed supported on a suitable zeolitic molecular sieve solid and can comprise from 0.05 to about 5.0 weight percent of the final composition. The Group VIII noble metal is impregnated on the catalyst or, in the preferred embodiment, is incorporated in the molecular sieve by an ion exchange reaction described hereinafter.

The substrate used for the catalyst comprises a dehydrated metallo aluminosilicate or zeolite which has a characteristic X-ray diffraction pattern and has pores of relatively uniform diameter from about 4 to about 18 angstrom units. The silica and aluminum are in combination with one or more exchangeable cations such as sodium, hydrogen, magnesium or calcium which are present as exchangeable cations on ion exchange sites of the aluminosilicate. The substrates, which have acquired a common classification in the art as molecular sieves, have silica to alumina ratios from about 2.5 to about 10 and the preferred substrates for use in this invention are those having ratios from about 3 to 8, and most preferably from about 4 to 6. The molecular sieves are commercially available in various designations such as A, X, Y, L, S and T, and of these the Y molecular sieves are preferred. These preferred molecular sieves have the aforementioned preferred silica to alumina ratios and have the general emperical formula as follows:

$$0.9 \pm 0.2 \; Na_2O : Al_2O_3 W SiO_2 X H_2O$$

wherein W is from 2.5 to about 6 and X is from 0 to 9.

The molecular sieves are generally prepared with sodium or potassium associated with the ion exchange sites and the monovalent metal is subsequently ion exchanged with any polyvalent metal or can be ion exchanged with an ammonium salt. Heating of the resulting ammonium charged molecular sieve decomposes the ammonium ion and leaves the hydrogen ion associated with the ion exchange site and this treatment is a preferred treatment for preparation of the catalyst used in my invention. The extent of the exchange of the monovalent metal with the polyvalent metal or with the ammonium can be sufficient to remove from 50 to 98 percent of the monovalent metal present in the molecular sieve; preferably from about 85 to about 95 percent removal is effected. The ammonium that is exchanged into the molecular sieve can thereafter be converted, if desired, to hydrogen by heating of the sieve for a period of 1 to 24 hours at a temperature of from 700° to about 1000° F.

The Group VIII noble metal can be incorporated in the molecular sieve by the various techniques such as impregnation of the molecular sieve with a salt of a Gorup VIII noble metal by immersing the molecular sieve in an aqueous solution of the salt and dissolving the solvent or by precipitating the Group VIII noble metal as an insoluble salt or oxide from the solution in the presence of the molecular sieve.

In a preferred technique, the Group VIII noble metal is incorporated in the molecular sieve by ion exchange techniques such as that disclosed in U.S. Pat. 3,236,762 wherein the molecular sieve is digested with an aqueous solution of the noble metal salt under ion exchange conditions to exchange the noble metal cation for the metal or ammonium ion originally present in the molecular sieve, separating the molecular sieve from the treating solution and thereafter reducing the noble metal cation on molecular sieve to its metal state by contacting with a suitable reducing agent such as carbon monoxide, hydrogen hydrazine, alkali metal borohydrides, alkali metal dithionites, etc.

The molecular sieves or synthetic zeolites can be prepared in accordance with the method described in U.S. Pats. 2,882,243 and 2,882,244 which in general involve digesting aqueous solutions of sodium silicate and sodium aluminate at elevated temperatures following low temperature aging treatment. The preparation of the preferred catalyst, i.e., the Y type zeolite, can be performed in accordance with the teachings of U.S. Pat. 3,239,471 which involves the initial low temperature aging of a mixture of silica hydrosol, sodium hydroxide and sodium aluminate, followed by a high temperature digestion to effect crystallization of the sodium zeolite.

The microcrystalline zeolitic preicipitate formed in the aforementioned digested step is thereafter dried by heating at ambient or low temperatures, e.g., up to about 300° F. to evaporate most of the water therefrom to obtain a dry powder containing up to about 20 weight percent water which can be readily handled by conventional techniques for the preparation of catalyst particles. This dry powder can be molded and compressed with tableting machines or extruders to provide pelleted catalysts that can be used in the reaction. Alternatively, the powder can be subsequently calcined and used directly or ground to a state of further subdivision for use in systems employing finely divided catalysts.

The catalyst particle size can vary over wide limits from about 0.5 inch to about 1 micron average diameter. The particle size selected depends on the type of solid-vapor contacting employed in the reaction zone. A dispersed gas phase reaction would employ the very fine particles passing about a 325 mesh screen. Use of a fluidized bed reactor would require use of particles passing a 20 but retained on a 400 mesh screen. Packed bed reactors or liquid slurry phase reaction conditions would use the larger diameter particles having diameters from about 0.05 to about 0.5 inch; preferably from about 0.1 to 0.25 inch.

The catalyst in the desired particle size for use in the invention is thereafter subjected to final calcining in dry air at a temperature of about 800°–900° F. for several hours and this treatment when applied to the zeolites having ammonium exchanged thereon results in decomposition of the ammonium to the hydrogen form of the zeolite.

If desired, the catalyst during the pelleting operation can be admixed with a suitable solid diluent, in a comparable particle size, such as titania, zirconia, alumina, silica, etc., or a combination of these materials in an amount from about 5 to about 75 weight percent of the final composition. Examples of suitable materials include the aluminum silicates, synthetic or naturally occurring clays, or any of the aforementioned hydrous metal oxides.

The catalyst is activated for the desired reaction in accordance with this invention by the pretreatment thereof with hydrogen at specified temperatures which impart the desired selective activity to the catalyst. The treatment can comprise contacting the catalyst with hydrogen at a hydrogen pressure of from about 0.5 to about 1000 atmospheres with the total pressure of the contacting being from about 1 to about 1000 atmospheres. If desired, the concentration of hydrogen in the vapor phase during the treatment can be from about 10 to about 100 percent of the total vapor contacted with the catalyst. Suitable inert diluents that can be used to dilute the hydrogen can include carbon dioxide, nitrogen, or low molecular weight alkanes, e.g., methane, ethane, propane, etc. The contacting with hydrogen is performed for a period of from 10 minutes to five hours; preferably from one-half to three hours; and simply comprises maintaining the catalyst at the desired temperature in contact with the hydrogen containing gas phase. This can be performed in an oven wherein the catalyst is heated to the desired temperature under hydrogen vapor or can be performed in the reaction zone itself by charging the catalyst to the olefin conversion reactor and introducing hydrogen to contact the catalyst at the necessary temperature for activation.

The catalyst is activated in accordance with this invention by treating with hydrogen at temperatures selected to impart the desired activity to the catalyst. When the catalyst is treated with the hydrogen containing gas as aforedescribed at temperatures from about 0° to about 100° F., the catalyst acquires activity for polymerization of the low molecular weight olefin to solid polyolefins of high molecular weight. When the pretreatment is performed at temperatures from about 100° to about 200° F., the catalyst acquires the property for alkylation of paraffins with the low molecular weight olefins aforedescribed. When the pretreatment is performed at temperatures of from about 200° to about 900° F., the catalyst acquires the activity for the oligomerization of the low molecular weight olefins to produce oligomers of intermediate molecular weight.

The catalyst after the pretreatment is used for the desired conversion under conventional processing conditions, e.g., under liquid phase or vapor phase heterogeneous processing conditions. In vapor phase operations the catalyst can be employed as solid pellets packed in a fixed bed reactor and the reactants can be introduced as a vapor stream into contact with the packed catalyst bed. Alternatively, the catalyst can be employed as a finely divided powder dispersed in the reactant vapors in a disperse or dense solid or fluidized phase according to conventional processing techniques. The catalyst can also be employed under liquid phase conditions as a slurry of the powdered or particulate catalyst in a liquid reaction medium that can be an excess of the reactants employed or can be any suitable inert liquid. Various organic liquids that can be employed for this purpose include: sulfoxides, sulfones, amides, ketones, ethers or esters, carboxylic acids, etc.

Illustrative of this last class of liquids are: acetic, propionic, butyric, pentanoic, hexanoic, heptanoic, octanoic acids, benzoic, toluic, phthalic acids, etc. Of these, the fatty carboxylic acids having from about 2 to about 8 carbons are preferred.

Other organic liquids that can be employed include the alkyl and aryl sulfoxides and sulfones such as dimethylsulfoxide, propylethylsulfoxide, diisopropylsulfone, decylmethylsulfoxide, butylamylsulfone, diisooctylsulfoxide, diphenylsulfoxide, methylbenzylsulfone, etc.

Another class of organic liquids that are inert are various amides such as formamide, dimethyl formamide, ethylisopropyl formamide, acetamide, n-phenylacetamide, N,N-dipropylacetamide, isobutyramide, N-ethylisobutyl-amide, isovaleric amide, N,N-dimethylisovaleric amide, isocaprylic amide, N,N-methyl-n-caprylic amide, N-propyl-n-heptanoic amide, isoundecyclic amide, etc.

Various alkyl and aryl ketones can also be employed as the reaction medium, e.g., acetone methylethyl ketone, diethyl ketone, diisopropyl ketone, ethyl-n-butyl ketone, methyl-n-amyl ketone, cyclohexanone, di-iso-butyl ketone, etc.

Ethers can also be employed as the reaction medium, e.g., diisopropyl ether, di-n-butyl ether, ethylene glycol diisobutyl ether, methyl o-tolyl ether, ethylene glycol dibutyl ether, diisoamyl ether, methyl p-tolyl ether, methyl m-tolyl ether, dichloroethyl ether, ethylene glycol diisoamyl ether, diethylene glycol diethyl ether, ethylbenzyl ether, diethylene glycol diethyl ether, diethylene glycol dimethyl ether, ethylene glycol dibutyl ether, ethylene glycol diphenyl ether, triethylene glycol diethyl ether, diethylene glycol di-n-hexyl ether, tetraethylene glycol dimethyl ether, tetraethylene glycol dibutyl ether, etc.

Various esters can also be employed as the reaction medium, e.g., ethyl formate, methyl acetate, ethyl acetate, n-propyl formate, isopropyl acetate, ethyl propionate, n-propyl acetate, sec-butyl acetate, isobutyl acetate, ethyl n-butyrate, n-butyl acetate, isoamyl acetate, n-amyl acetate, ethyl formate, ethylene glycol diacetate, glycol diformate, cyclohexyl acetate, furfuryl acetate, isoamyl n-butyrate, diethyl oxalate, isoamyl isovalerate, methyl benzoate, diethyl malonate, valerolactone, ethyl benzoate, methyl salicylate, n-propyl benzoate, n-dibutyl oxalate, n-butyl benzoate, diisoamyl phthalate, dimethyl phthalate, diethyl phthalate, benzyl benzoate, n-dibutyl phthalate, etc.

The reaction is performed under polymerization or alkylation conditions. The conditions generally include pressures from about 1 to about 1000 atmospheres and temperatures from about 50° to about 500° F. Preferably, the reaction pressure is from about 10 to about 200 atmospheres and the temperature is from about 125° to about 300° F. The polymerization or oligomerization of the low molecular weight olefin is achieved by introducing the olefin into contact with the catalyst which is present as a packed bed of solids in a reactor or is dispersed in a liquid or vapor phase reaction mixture. The alkylation is performed by introducing a mixture of olefin and paraffin into contact with the catalyst in a similar processing. The reactant or reactants, if desired, can be diluted with suitable inerts such as the aforementioned carbon dioxide or nitrogen, or in the cases of polymerization and oligomerization, in the presence of low molecular weight paraffins such as methane, ethane, propane, etc.

The recovery of the product from the reaction zone varies somewhat on the nature of the particular conversion performed. When the product is a solid polyolefin, the reaction can be continued until the solid has accumulated in the reaction zone to a sufficient quantity to warrant discontinuing the reaction and recovering the solid product therefrom. When liquid phase processing is employed, the organic reaction liquid can preferably be a solvent for the particular polyolefin, e.g., the aforementioned paraffinic hydrocarbons can be employed as the reaction medium, and a portion of the liquid phase can be continuously withdrawn from the reaction zone, the catalyst can be separated from the liquid phase, and the solvent evaporated to precipitate the solid polyolefin as a product of the reaction. The solvent and catalyst can be recycled to the reaction zone to maintain the liquid and catalyst inventory therein.

When the products are relatively volatile under the reaction conditions, e.g., the oligomers of olefins or the various alkylates of the paraffin with the olefin, the reaction can be performed under conditions which strip or vaporize the product from the reaction zone and continuously remove the product in the vapor phase. Alternatively, a portion of the liquid phase reaction medium can be withdrawn and the product can be recovered by conventional distillation from the liquid effluent. When the reaction is performed under entirely vapor phase conditions, the products are, of course, removed in the vapor effluent from the reaction zone and can be recovered therefrom by condensation and subsequent fractionation.

In all of the various processing techniques, the vapor effluent from the reaction zone can be cooled to collect condensate therefrom and the unconverted hydrocarbon olefin and, during alkylation conditions, unconverted paraffin can be recycled by compressing and returning these reactants to the reaction zone.

Various techniques can be used to maintain the desired temperature for the reaction. The reactants can be preheated to the desired reaction temperature and the temperature maintained in the reaction zone by use of a suitable heat exchange medium to remove or to add heat as required for temperature maintenance. The use of a liquid reaction solvent permits the continuous refluxing of the reaction solvent to maintain the desired reaction temperature by vaporizing solvent which is condensed and returned to the reaction zone. Alternatively, the reaction zone temperature can be maintained by withdrawing a portion of the liquid phase and passing it through a heat exchanger to remove or add heat as necessary to maintain the temperature. Various conventionally employed heat exchange means such as cooling coils can also be immersed in the liquid phase or imbedded in the packed catalyst bed contained within the reaction zone to permit circulation of the heat exchange fluid in indirect heat exchange relationship with the reaction zone contents to thereby maintain the desired temperature.

The reaction is performed until the activity of the catalyst has been descreased sufficiently to justify regeneration of the catalyst. The rate of deactivation of the catalyst varies considerably with the desired reaction, e.g., separation of a solid polyolefin frequently results in rapid deactivation because of the occlusion or impregnation of the catalyst with the solid polymer product. To some extent this rate of deactivation can be reduced by performing the reaction in a liquid having a solvency for the polyolefin and this is a preferred technique.

When the catalyst has been deactivated sufficiently for regeneration, the catalyst can be removed from the reaction zone and regenerated. Preferably, the catalyst removed from the reaction zone is contacted or washed with a solvent for polyolefins to remove any occluded or dissolved polyolefin contained on the catalyst. Examples of suitable solvents include the aforementioned hydrocarbons. Thereafter the catalyst is drained, the solvent is evaporated therefrom and the catalyst is then regenerated by contacting with oxygen in accordance with conventional regeneration techniques. These techniques include contacting of the catalyst with a gas containing from 0.5 to about 10 percent oxygen at temperatures from about 350° to about 1000° F. to initiate combustion of any of the high molecular weight product on the catalyst. This regeneration is performed for a period of from 0.1 to about 5 hours, sufficient to deplete the catalyst of its carbon content. Thereafter the catalyst is subjected to the aforementioned hydrogen pretreatment prior to contacting with the hydrocarbon reactants.

The invention will now be described by reference to specifically illustrated modes of practice thereof:

Example 1

A catalyst comprising 0.5 weight percent palladium impregnated with an ion exchange procedure on a Y molecular sieve zeolitic catalyst was employed in this example. The preparation of the catalyst comprised the preparation of a sodium Y type zeolite having a silica to alumina mol ratio of about 4.7. The sodium zeolite was ion exchanged with an aqueous solution of ammonium chloride to exchange the sodium cations with ammonium and reduce the sodium content, expressed as the oxide, to about 2 percent by weight. The resulting ammonium zeolite was then partially back ion exchanged by contacting with an aqueous magnesium sulfate solution to obtain a zeolite having a magnesium content expressed as magnesium oxide of about 5 weight percent. The resulting ammonium-magnesium zeolite was then further ion exchanged with an aqueous solution of tetraamine palladium chloride to add 0.5 weight percent of palladium to the catalyst by ion exchange. The final zeolite was then filtered, drained and dried at a temperature below 400° F. to a water content of about 20 weight percent and then compressed in a tableting machine to form ⅛-inch pellets. The pelleted catalyst was then calcined in dry air for about 16 hours at 950° F. to convert the magnesium-ammonium-palladous zeolite to magnesium-hydrogen-palladium zeolite with about 50 percent of the ion exchange capacity satisfied by hydrogen ion.

The catalyst was treated with the hydrogen by admixing portions of the particulate catalyst with an equal volume of quartz chips and placing the admixture in a tubular reactor having means for the introduction and removal of liquid and vapor reactants. The catalyst was pretreated in the reactor that was used for the subsequent conversion of the olefin by introducing hydrogen to flow downwardly through the packed catalyst bed in the reactor.

Upon completion of the aforementioned activation treatments, the catalyst was then employed for the production of higher molecular weight products from olefins.

In a first experiment, the reactor was charged with the aforeindicated quantities of catalyst and quartz chips, heated to 700° F. and hydrogen was slowly passed through the catalyst at 50 p.s.i.g. pressure. The treatment with hydrogen was continued for 2 hours and the catalyst was then cooled to about 150° F. and ethylene was introduced at 500 p.s.i.g. at a rate of 100 milliliters per minute, diluted with heptane that was introduced at a rate of 50 milliliters, liquid volume, per hour. The ethylene and heptane were passed through the reactor at the aforeindicated conditions for a period of 4 hours. The vapor effluent from the reaction zone was passed through an acetone-dry ice cooled trap to condense any liquid product therefrom. The collected liquid was sampled and analyzed by gas chromatography to indicate that it comprised chiefly butenes and hexenes.

Example 2

The reaction was repeated by charging the reactor with fresh quantities of catalyst diluted with an equal volume of quartz chips and hydrogen was passed over the catalyst at 300° F. and 500 p.s.i.g. for two hours. Upon completion of the pretreatment, the flow of hydrogen was ceased and ethylene was introduced while maintaining the temperature at 300° F. The ethylene was introduced at 1000 milliliters per minute, diluted with heptane introduced at a rate of 50 milliliters, liquid volume, per hour. The reaction was run for 1 hour and the liquid product collected in the trap was analyzed by gas chromatography to indicate the following products from the reaction:

| Component: | Weight percent |
|---|---|
| Butenes | 52.6 |
| Hexenes | 26.8 |
| Octenes | 17.9 |
| Decenes | 2.7 |

Oligomerization of other olefins, e.g., of octene-1, can be achieved by substituting an equal molar volume of liquid octene-1 for the gaseous ethylene employed in the preceding example.

Example 3

The experiment was repeated by charging the reaction zone with 200 mililiters of the aforeindicated catalyst diluted with 200 milliliters quartz chips. The catalyst was treated with hydrogen by bypassing hydrogen over the catalyst at 500 p.s.i.g. at 150° F. For a period of about 2 hours. Thereafter the hydrogen flow was ceased and ethylene was introduced into the reaction zone while maintaining the temperature at 167° F. and the reactor pressure at about 450 p.s.ig. The ethylene was introduced at a rate of 100 milliliters per minute, diluted with heptane introduced at 60 milliliters, liquid volume, per hour. The reaction was continued for 2 hours and a sample of the product collected in the condensate trap was analyzed by gas chromatography and mass spectra. It was found that the product contained over 99 percent of saturated hydrocarbons, both paraffinic and mononaphthenic, and the carbon number distribution was as follows:

| Component: | Weight percent |
|---|---|
| $C_6$ | 7.5 |
| $C_7$ | 4.6 |
| $C_8$ | 15.0 |
| $C_9$ | 34.8 |
| $C_{10}$ | 18.7 |
| $C_{11}$ | 12.3 |
| $C_{13}$ | 3.4 |
| $C_{15}$ | 3.7 |

Alkylation of propane can be achieved using the same procedure simply by substituting an equal molar volume of propane in gaseous state for the liquid heptane introduced in the preceding example.

Example 4

The reaction was repeated by charging 100 milliliters of the catalyst aforedescribed and 100 milliliters quartz chips in intimate admixture to the reactor. The reactor was then pressured to 50 p.s.i.g. with hydrogen and hydrogen was passed through the catalyst for 2 hours at 73° F. The hydrogen flow was then discontinued and the catalyst was heated to 150° F. and ethylene was introduced at 500 p.s.i.g. The introduction of the ethylene initiated a rapid exothermic reaction which required cooling to reduce the temperature to about 220° F. Upon completion of the reaction the catalyst was removed and found to contain substantial quantities of solid polymer comprising a total of 12 grams high molecular weight solid polyethylene. A portion of the liquid product recovered in the product trap was sampled and analyzed to reveal a low yield of butenes and hexenes.

The preceding examples are intended solely to illustrate preferred modes of practice of the invention and to demonstrate results obtainable thereby. It is not intended that the examples be unduly limiting of the invention, but instead it is intended that the invention be defined by the steps, reagents and catalyst components and their obvious equivalents set forth in the following claims.

I claim:
1. A method for the polymerization of ethylene which comprises impregnating a palladium salt or ion exchanging palladium from a palladium salt onto a solid, metallic, aluminosilicate zeolite having pores of substantially uniform diameter from about 4 to 18 angstrom units and a silica to alumina ratio of about 2.5 to 10, calcining the resultant solid in dry air at a temperature from about 700° to 1000° F. for a period of 1 to 24 hours, pretreating the solid by contacting said solid with hydrogen for 1 to about 4 hours at a temperature from 0° to about 100° F., and contacting the solid so pretreated with ethylene at a temperature from 50° to about 500° F. to produce solid polyethylene of high molecular weight.

2. The method of claim 1 wherein said zeolite is a crystalline aluminosilicate having a mol ratio of silica to alumina between about 3 and 8.

3. The polymerization of ethylene wherein ethylene is contacted, under polymerization conditions including temperatures from 50° to 500° F. and pressures from 100 to 1000 p.s.i., sufficient to produce solid polyethylene, with a catalyst prepared by impregnating or ion exchanging a palladium salt onto a metallic aluminosilicate zeolite having pores of substantially uniform diameter from about 4 to 18 angstrom units and a silica to alumina ratio of about 2.5 to 10, calcining the catalyst in dry air at a temperature from about 700° to 1000° F. for a period of from 1 to 24 hours and preconditioning the catalyst before contacting it with ethylene by contacting it with hydrogen at a temperature from 0° to about 100° F. for a period of 1 to about 4 hours.

4. The method of claim 3 wherein from 50 to 98 of the ion exchange capacity of the zeolite is satisfied by hydrogen.

5. The method of claim 4 wherein said zeolite is a Y molecular sieve.

References Cited

UNITED STATES PATENTS

| | | | |
|---|---|---|---|
| 3,277,071 | 10/1966 | Cotton | 260—94.9 D |
| 3,236,762 | 2/1966 | Rabo et al. | 260—683.15 R |
| 2,589,189 | 3/1952 | Ciapetta et al. | 260—683.15 R |
| 3,393,251 | 7/1968 | Fenton | 260—683.15 R |
| 2,656,398 | 10/1953 | De Vault | 260—683.15 R |

FOREIGN PATENTS

| | | | |
|---|---|---|---|
| 624,931 | 8/1961 | Canada | 260—94.9 D |

JOSEPH L. SCHOFON, Primary Examiner

E. J. SMITH, Assistant Examiner

U.S. Cl. X.R.
260—93.7, 94.9 D